US012683376B2

(12) United States Patent (10) Patent No.: US 12,683,376 B2
Daley (45) Date of Patent: Jul. 14, 2026

(54) ENERGY-LIMITING DEVICE FOR A SURGE ARRESTER

(71) Applicant: Eaton Intelligent Power Limited, Dublin (IE)

(72) Inventor: Charles William Daley, Olean, NY (US)

(73) Assignee: Eaton Intelligent Power Limited, Dublin (IE)

( * ) Notice: Subject to any disclaimer, the term of this patent is extended or adjusted under 35 U.S.C. 154(b) by 153 days.

(21) Appl. No.: 18/223,823

(22) Filed: Jul. 19, 2023

(65) Prior Publication Data

US 2024/0030698 A1 Jan. 25, 2024

Related U.S. Application Data

(60) Provisional application No. 63/391,985, filed on Jul. 25, 2022.

(51) Int. Cl.
*H01C 7/12* (2006.01)
*H02H 1/00* (2006.01)
*H02H 1/04* (2006.01)
*H02H 3/08* (2006.01)
*H02H 3/22* (2006.01)
*H02H 9/06* (2006.01)

(52) U.S. Cl.
CPC ..................................... *H02H 3/08* (2013.01)

(58) Field of Classification Search
CPC ........................................................ H02H 3/08
USPC ........................................................ 361/118
See application file for complete search history.

(56) References Cited

U.S. PATENT DOCUMENTS

| | | | | | |
|---|---|---|---|---|---|
| 2,146,656 | A | * | 2/1939 | Skeats | H01H 33/76 |
| | | | | | 218/90 |
| 5,057,810 | A | * | 10/1991 | Raudabaugh | H01T 1/14 |
| | | | | | 361/124 |
| 5,434,550 | A | * | 7/1995 | Putt | H01T 1/14 |
| | | | | | 200/61.08 |
| 6,710,699 | B2 | | 3/2004 | Kaltenborn et al. | |
| 10,109,399 | B2 | * | 10/2018 | Boese | H01T 1/14 |
| 11,120,957 | B2 | | 9/2021 | Lell | |

(Continued)

OTHER PUBLICATIONS

"UltraSIL™ Polymer-Housed Evolution™ (10KA) IEEE® Surge Arresters for MV Systems to 36 Kv," Cooper Power Series Surge Arrester Catalog Data, CA235018EN, Eaton Corporation (Apr. 2021).

(Continued)

*Primary Examiner* — Crystal L Hammond
*Assistant Examiner* — Lucy M Thomas
(74) *Attorney, Agent, or Firm* — DiBerardino McGovern IP Group LLC

(57) ABSTRACT

An energy-limiting assembly includes: a current interrupter that includes: a current interrupting assembly; a sidewall that extends from a first end to a second end; a first end cap mounted to the first end; and a second end cap mounted to the second end. The sidewall, the first end cap, and the second end cap define an interior region. The energy-limiting arrester also includes a disconnect in the interior region, the disconnect including: a movable electrically conductive element that, when in a first position, is electrically connected to the current interrupting assembly and forms part of a current path through the energy-limiting assembly.

20 Claims, 13 Drawing Sheets

(56)　　　　　　References Cited

U.S. PATENT DOCUMENTS

| | | | |
|---|---|---|---|
| 11,181,567 | B2 | 11/2021 | O'Regan et al. |
| 2020/0273648 | A1 | 8/2020 | Lell |
| 2020/0343713 | A1 | 10/2020 | van Besouw et al. |
| 2022/0077673 | A1 | 3/2022 | Kester et al. |

OTHER PUBLICATIONS

Woodworth, "What is a Lightning Arrester?", Rev. 6, ArresterFacts Tutorial Series, ArresterWorks, available at http://arresterworks. com/pdf_file/what_is_an_arrester.pdf (2016).

* cited by examiner

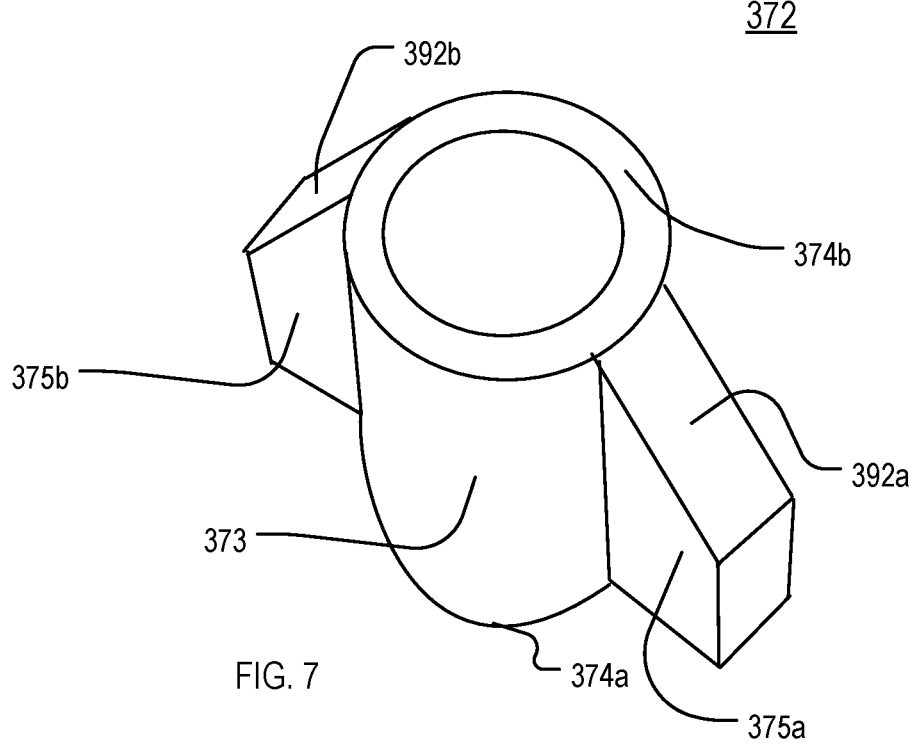
372
392b
374b
375b
392a
373
374a
375a
FIG. 7
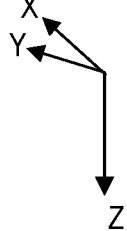
X
Y
Z

9

9'

380b

381

337

380a

1100

1388

1387

1388

ENERGY-LIMITING DEVICE FOR A SURGE ARRESTER

CROSS-REFERENCE TO RELATED APPLICATION

This application claims the benefit of U.S. Provisional Application No. 63/391,985, filed on Jul. 25, 2022 and titled ENERGY-LIMITING DEVICE FOR A SURGE ARRESTER, which is incorporated herein by reference in its entirety.

TECHNICAL FIELD

This disclosure relates to an energy-limiting device for a surge arrester.

BACKGROUND

Surge arresters are used to protect equipment from excessively high voltages that may occur during fault conditions.

SUMMARY

In one aspect, an energy-limiting assembly includes: a current interrupter that includes: a current interrupting assembly; a sidewall that extends from a first end to a second end; a first end cap mounted to the first end; and a second end cap mounted to the second end. The sidewall, the first end cap, and the second end cap define an interior region. The energy-limiting arrester also includes a disconnect in the interior region, the disconnect including: a movable electrically conductive element that, when in a first position, is electrically connected to the current interrupting assembly and forms part of a current path through the energy-limiting assembly.

Implementations may include one or more of the following features.

The disconnect also may include a locking assembly configured to hold the electrically conductive element in the first position; and a key configured to deactivate the locking assembly to release the electrically conductive movable element to open the current path. The disconnect also may include a snuffer element that at least partially surrounds the moveable electrically conductive element when the moveable electrically conductive element is in the first position. The snuffer element may be a tube. The snuffer element may include a fire-suppressing material.

In some implementations, the disconnect also includes an electrically conductive piston attached to the key; and the electrically conductive piston is configured to actuate the key. The disconnect also may include a retention structure configured to receive a potting material.

The current interrupter may include a fuse, and the current interrupting assembly may include at least one fusible element in the interior region. The at least one fusible element is electrically connected to the disconnect.

In another aspect, a disconnect includes: a disconnection conductor that forms at least part of a current path through the disconnect when in a first position; a locking assembly configured to hold the disconnection conductor in the first position; an activation assembly configured for activation based on a current that exceeds a threshold flowing in the disconnect; and a key attached to a piston, the piston being configured to move in response to activation of the activation assembly to thereby cause the key to deactivate the locking assembly and release the disconnection conductor and open the current path.

Implementations may include one or more of the following features.

The disconnection conductor may include an opening; the locking assembly may include a moveable release element that extends into the opening to hold the disconnection conductor in the first position; and, to deactivate the locking assembly, the key may cause the moveable release element to retract from the opening to release the disconnection conductor. The piston may be configured to move in the bore to activate the key, and the disconnect also may include: a resistive ring; a conductive body that defines a recess and a bore; and an insulator between the piston and the activator. The current path through the disconnect further includes the resistive ring when the current is below a pre-determined level, and the current path through the disconnect further includes an arc between the piston and the activator when the current is above the pre-determined level. The activator may expand in response to heat from the arc. The locking assembly also may include: a recess; and a spring in the recess and attached to the movable release element, where the key deactivates the locking assembly by pressing the movable release element such that at least part of the movable release element retracts into the recess. The key may include a first side and a second side, where the first side is attached to the piston; the second side contacts the electrically conductive element when the locking assembly holds the electrically conductive element in the first position; and the second side of the key has a smaller extent than the first side of the key.

The disconnect also may include an arc-snuffer structure that at least partially surrounds the electrically conductive element when the locking assembly holds the electrically conductive element in the first position. The snuffer element may be a fire-suppressing material.

The disconnect also may include a retention structure that holds the locking assembly and the activator, the retention structure configured such that only the disconnection conductor is expelled from the disconnect. The retention structure may include an inner wall that has surface features.

In some implementations, the activation assembly is configured to emit gas when activated, and the pressure of the gas pushes the piston and the key toward the locking assembly to thereby at least partially cause the key to deactivate the locking assembly and release the disconnection conductor and open the current path.

In another aspect, a system includes: a surge arrester; and an energy-limiting device configured for electrical connection to the surge arrester. The energy-limiting device includes: a current interrupter that includes a housing that defines an interior; and a disconnect in the interior and electrically connected to the current interrupter. The disconnect includes: a disconnection conductor; a locking assembly configured to hold the disconnection conductor in a first position; and a key attached to a moveable piston, the key configured to cause the locking assembly to release the disconnection conductor.

In some implementations, a piston is configured to push the key toward the locking assembly to release the disconnection conductor from the locking assembly in response to a current greater than a threshold current flowing in the disconnect, and the threshold current is less than a rated current of the current interrupter.

In another implementation, a system includes: a surge arrester; and an energy-limiting device configured for electrical connection to the surge arrester. The energy-limiting device includes: a disconnect including: a moveable electrically conductive element; a locking assembly configured to hold the moveable electrically conductive element in a first position; and a key attached to a moveable piston, the key configured to cause the locking assembly to release the moveable electrically conductive element from the first position.

Implementations may include one or more of the following features.

The moveable piston may be configured to push the key toward the locking assembly to release the disconnection conductor from the locking assembly. The disconnect also may include a snuffer element that at least partially surrounds the moveable electrically conductive element when the moveable electrically conductive element is in the first position. The snuffer element may be a tube. The snuffer element may be a fire-suppressing material.

The disconnect also may include a retention structure configured to receive a potting material.

The energy-limiting device also may include a current interrupter that includes at least one fusible element in an interior region of the current interrupter; and the at least one fusible element is electrically connected to the disconnect and to the surge arrester.

An electrical terminal of the disconnect is configured for direct electrical connection to the surge arrester.

In another implementation, an energy-limiting assembly includes: a current interrupter including: a current interrupting assembly; a sidewall that extends from a first end to a second end; a first end cap mounted to the first end; and a second end cap mounted to the second end. The sidewall, the first end cap, and the second end cap define an interior region. The energy-limiting assembly also includes a disconnect in the interior region, the disconnect including: a movable electrically conductive element that, when in a first position, is electrically connected to the current interrupting assembly and forms part of a current path through the energy-limiting assembly.

Implementations of any of the techniques described herein may be a an energy-limiting device, a disconnect, an assembly, a system, a method, or a process. The details of one or more implementations are set forth in the accompanying drawings and the description below. Other features will be apparent from the description and drawings, and from the claims.

DRAWING DESCRIPTION

FIG. 7 is a perspective view of an example of a locking tip.

DETAILED DESCRIPTION

Figure 1:
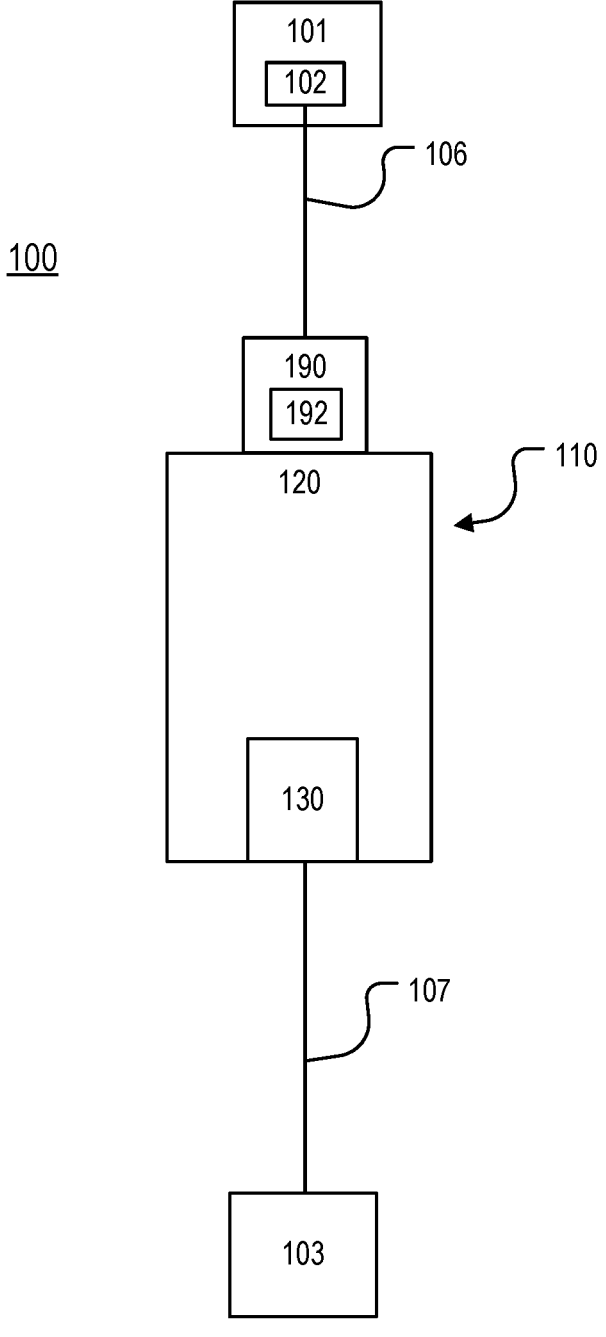
FIG. 1 is a block diagram of an example of a system that includes a surge arrester and an energy-limiting device.

FIG. 1 is a block diagram of a system 100 that includes a surge arrester 190 and an energy-limiting device 110. The energy-limiting device 110 includes a current interrupter 120 and a disconnect 130. The energy-limiting device 110 is connected to the surge arrester 190. The current interrupter 120 interrupts currents that exceed its current rating, which may be relatively high (for example, 2 kilo Amperes (kA)) or greater. The disconnect 130 interrupts currents that are less than the current rating of the current interrupter 120 without generating a meaningful amount of sparks and/or heated debris. This configuration allows the energy-limiting device 110 to interrupt the flow of fault current before the surge arrester 190 generates sufficient sparks and/or debris to ignite nearby objects. Moreover, the energy-limiting device 110 interrupts the flow of fault current without generating sparks and/or debris sufficient to ignite nearby objects.

The surge arrester 190 is connected in parallel with a separate piece of equipment (not shown) such that the arrester 190 protects the separate piece of equipment from over-voltage conditions that may arise due to a fault event (such as a lighting strike or switching surge). The arrester 190 includes an electrical component 192 that has a high impedance under ordinary operating conditions. As the voltage across the electrical component 192 and the parallel-connected protected equipment increases, the impedance of the electrical component 192 decreases. At voltages above a breakdown voltage associated with the material of the electrical component 192, the impedance of the electrical component 192 is negligible and the electrical component 192 forms a low-impedance or no-impedance current path that diverts the fault current away from the protected equipment and clamps the voltage produced by the fault event. The electrical component 192 is configured such that, when the voltage across the electrical component 192 increases beyond the maximum safe voltage or beyond the rated voltage for the protected equipment, the electrical component 192 provides the low impedance current path. The electrical component 192 may be, for example, a semiconductor. In some implementations, the electrical component 192 is one or more metal oxide varistors (MOV) made of zinc oxide (ZnO).

The electrical current conducted by the arrester 190 during a fault event (when the electrical component 192 has low impedance) may be very large. For example, the current conducted by the electrical component 192 during a fault event may be greater than 100 amperes (A), greater than 1 kiloAmpere (kA), between 1 kA and 100 kA, or greater than 100 kA. The energy-limiting device 110 reduces or eliminates the risk that operation or failure of the surge arrester 190 will generate sparks and/or heated debris sufficient to ignite nearby object or objects.

In greater detail, the current interrupter 120 may be a fuse or any other type of interruption mechanism that interrupts fault currents caused by, for example, lightning strikes, falling objects, switching surges, or equipment failure. The current interrupter 120 interrupts currents that are above a rated current. For example, the current interrupter 120 may be designed to interrupt fault currents above 2000 Amperes (A) or above 3000 A or impulse currents of 100 kiloAmperes (kA) or greater. The disconnect 130 is configured to interrupt currents that exceed the rated or expected operating current of the system 100 but are less than the current interruption rating of the current interrupter 120. For example, in implementations in which the current interrupter 120 has an interruption rating of 2000 A, the disconnect 130 may be configured to interrupt currents between 20 A and 2000 A. During the short amount of time (for example, 10 microseconds or less) between the fault occurrence and the fault current growing to the rated current of the current interrupter 120, the current interrupter 120 may begin generating sparks.

As discussed in more detail below, the disconnect 130 interrupts fault currents before sparks and debris are generated by the current interrupter 120 or the arrester 190. Moreover, the disconnect 130 is designed to withstand currents at or near the rated and impulse currents of the current interrupter 120, and the disconnect 130 does not generate sparks or debris in a sufficient amount during a fault event to ignite objects in the vicinity of the device 110. Additionally, the disconnect 130 does not break into pieces (for example, in half) to achieve disconnection. These features of the energy-limiting device 110 act to reduce or eliminate sparking and debris expulsion under fault conductions and thus act to reduce or eliminate the risk of igniting objects near the energy-limiting device 110 during and/or after a fault condition.

Before discussing the energy-limiting device 110 and the disconnect 130 in greater detail, additional information about the system 100 is provided.

The surge arrester 190 is electrically connected in series with the energy-limiting device 110. The energy-limiting device 110 may be directly mounted to the surge arrester 190. The surge arrester 190 and the energy-limiting device 110 are electrically connected to a device, point, or node 102 in the AC power grid 101 via a first conductor 106 and to a grounded node 103 via a second conductor 107. Under ordinary, steady-state operation of the system 100, the conductors 106 and 107 are substantially electrically isolated due to the high impedance of the electrical component 192.

The AC power grid 101 is a three-phase power grid that operates at a fundamental frequency of, for example, 50 or 60 Hertz (Hz). The power grid 101 includes devices, systems, and components that transfer, distribute, generate, and/or absorb electricity. For example, the power grid 101 may include, without limitation, generators, power plants, electrical substations, transformers, renewable energy sources, distributed energy sources (DERs), transmission lines, reclosers and switchgear, fuses, additional surge arresters, combinations of such devices, and any other device used to transfer or distribute electricity. A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

The power grid 101 may be low-voltage (for example, up to 1 kilovolt (kV)), medium-voltage or distribution voltage (for example, between 1 kilovolt (kV) and 35 kV), or high-voltage (for example, 35 kV and greater). The power grid 101 may include more than one sub-grid or portion. For example, the power grid 101 may include AC micro-grids, AC area networks, or AC spot networks that serve particular customers. These sub-grids may be connected to each other via switches and/or other devices to form the grid 101. Moreover, sub-grids within the grid 101 may have different nominal voltages. For example, the grid 101 may include a medium-voltage portion connected to a low-voltage portion through a distribution transformer. All or part of the power grid 101 may be underground.

The electrical power system 100 may include additional components and systems that are not shown in FIG. 1 or discussed above. For example, the electrical power system 100 may include cabinets, transformers, transmission lines and cables, substations, and support structures, just to name a few. All or part of the AC power system 100 may be underground.

Figures 2A, 2B, 2C:
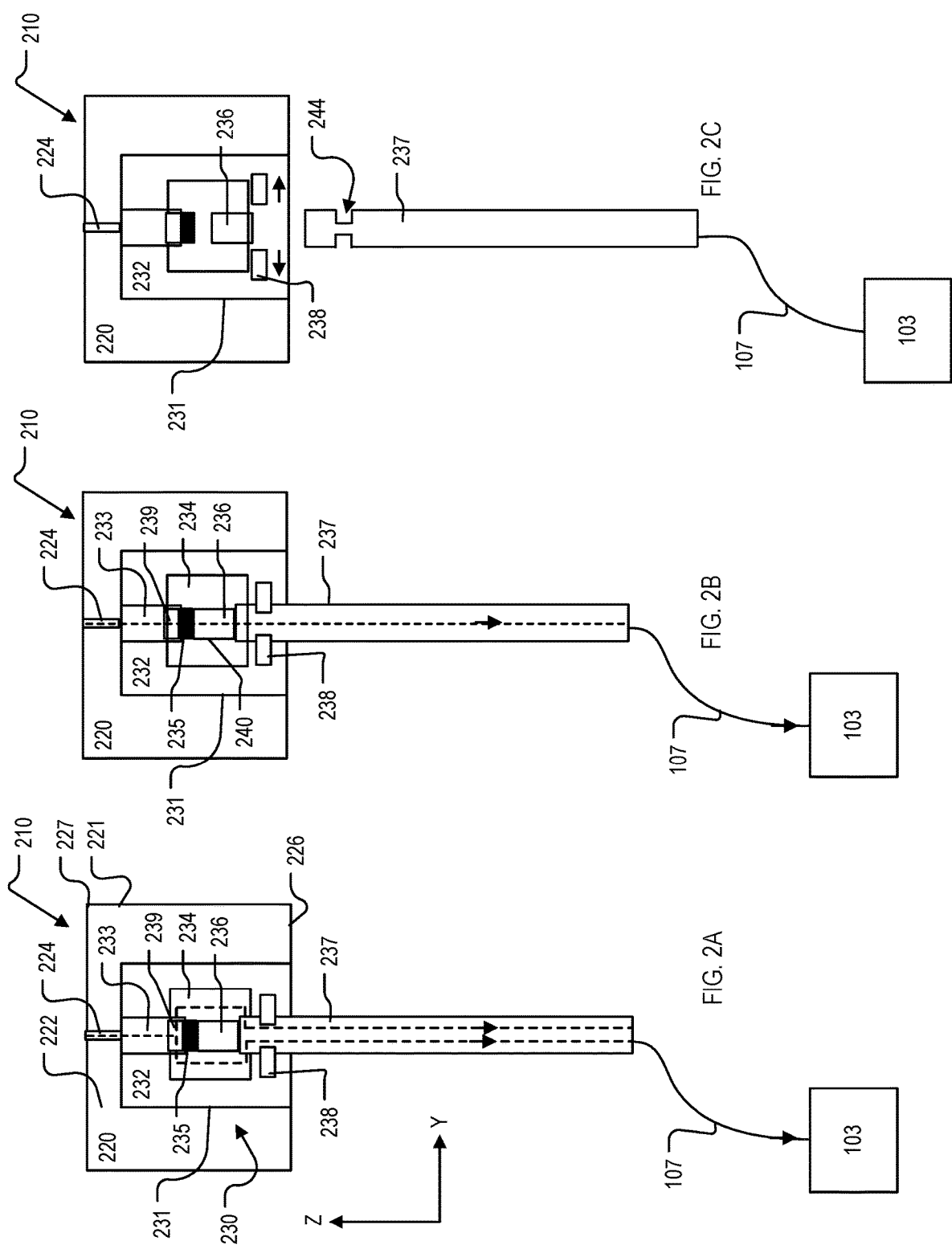
FIG. 2A shows an example of an energy-limiting device during ordinary steady-state operation.
FIG. 2B shows the energy-limiting device of FIG. 2A immediately after a fault condition occurs.
FIG. 2C shows the energy-limiting device of FIG. 2A after activation of a disconnect in the energy-limiting device.

FIGS. 2A-2C are cross-sectional block diagrams of an energy-limiting device 210. The energy-limiting device 210 is an example of an implementation of the energy-limiting device 110. The energy-limiting device 210 may be used in the system 100 (FIG. 1). The energy-limiting device 210 includes a current interrupter 220 and a disconnect 230. FIG. 2A shows the energy-limiting device 210 during ordinary steady-state operation. Although the electrical component 192 of the surge arrester 190 (FIG. 1) substantially isolates the node 102 from the node 103, a negligible amount of current flows in a current path in the energy-limiting device 210 to the node 103. FIG. 2B shows the energy-limiting device 210 immediately after a fault condition occurs. In FIGS. 2A and 2B, the dotted lines shows the current path. FIG. 2C shows the energy-limiting device 210 after the disconnect 230 has activated to disconnect the surge arrester 190.

The current interrupter 220 includes a housing 221 that defines an interior space 222. The housing 221 is a cylindrically shaped body that extends in the Z direction from a first end 226 to a second end 227. A fusible element 224 is in the interior space 222. The fusible element 224 is made of an electrically conductive material. The fusible element 224 melts or otherwise separates when the current in the fusible element 224 exceeds a rated current value. The fusible element 224 may be made from a metal, such as, for example, aluminum, zinc, silver, or copper; or from a metal alloy, such as, for example, brass. The interior space 222 may be partially or completely filled with an arc-quenching or arc-suppressing material, such as, for example, sand and/or quartz.

The disconnect 230 includes a housing 231. The housing 231 is a cylindrically shaped body that is positioned in the interior space 222 at or near the first end 226 of the housing 221. The housing 231 is made of a durable material such as, for example, metal, ceramic, or a solid polymer. The housing 231 defines an interior 232 that includes an activation assembly 233, an electrically conductive body 234, an insulator 235 (shown with black shading in FIGS. 2A-2C), a piston 236, and a locking assembly 238. The activation assembly 233 includes an activation mechanism 239.

The activation assembly 233 is made of an electrically conductive material, such as a metal, for example, copper; or a metal alloy, for example, brass. The activation mechanism

239 is entirely or partially within the activation assembly 233. The activation mechanism 239 is any device or material that is activated by heat and/or pressure. For example, the activation mechanism 239 may be an explosive charge, an explosive powder, a varistor, or another element that expands or breaks apart when exposed to heat. The activation mechanism 239 may be enclosed in a cartridge. In some implementations, the activation mechanism 239 is a gas-filled or liquid-filled cartridge that emits the gas and/or explodes when exposed to heat.

Figure 3:
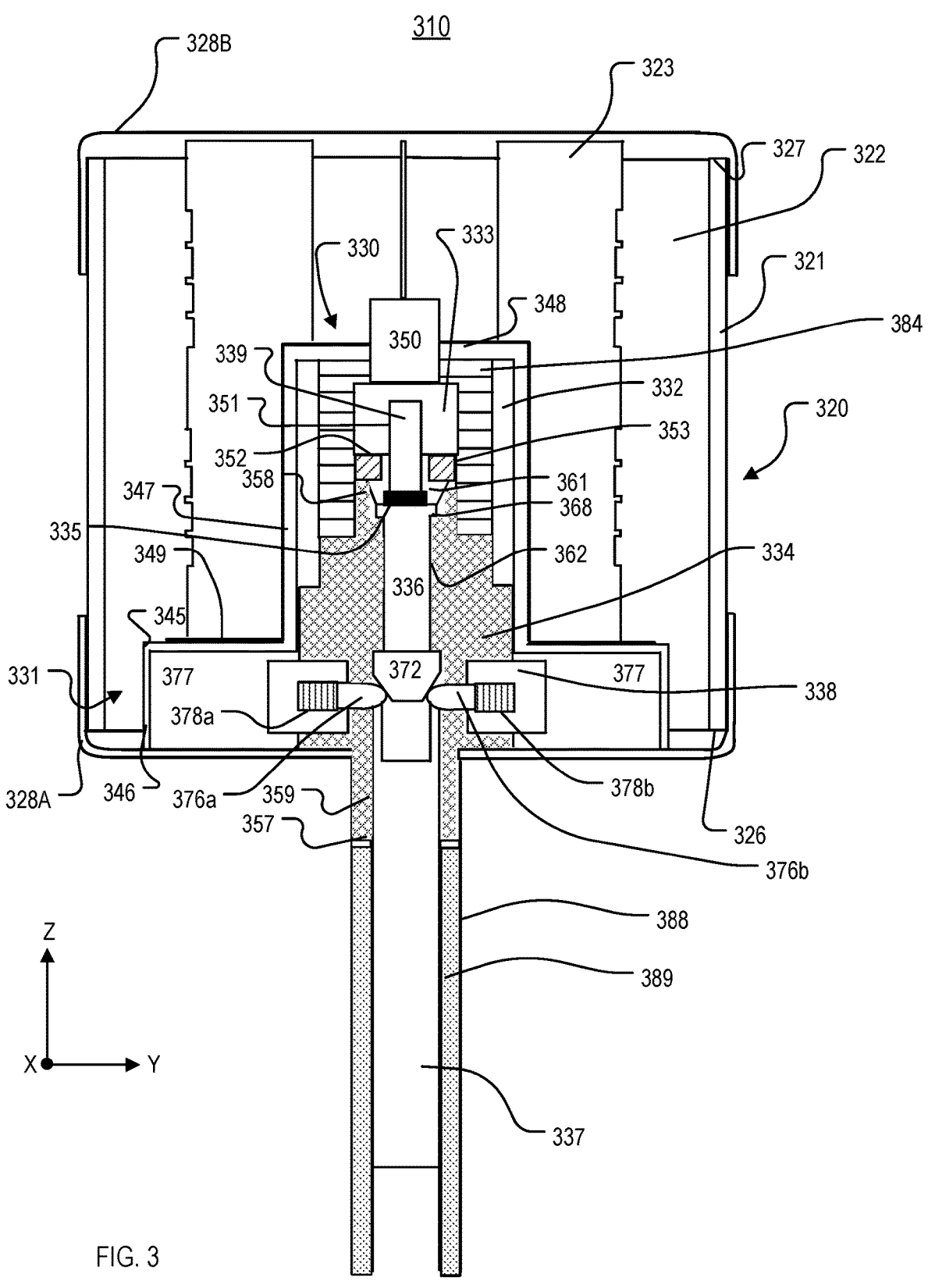
FIG. 3 is a cross-sectional view of another example of an energy-limiting device that includes a current interrupting device and a disconnect.

The electrically conductive body 234 is electrically connected to the activation assembly 233. In some implementations, the electrically conductive body 234 is electrically connected to the activation assembly 233 through a resistive element. An example of such an implementation is shown in FIG. 3. The electrically conductive body 234 is a solid body of electrically conductive material. For example, the electrically conductive body 234 may be a solid body of brass, copper, aluminum, or gold. The electrically conductive body 234 also defines a cylindrical bore 240 that extends generally in the Z direction.

The piston 236 is an electrically conductive cylinder that extends in the Z direction and is in the bore 240. The piston 236 is a separate element and is not part of the electrically conductive body 234 or the activation assembly 233. The piston 236 is able to move in the Z direction and the –Z direction in the bore 240.

The insulator 235 is between the piston 236 and the activation assembly 233. The insulator 235 separates the piston 236 and the activation assembly 233 in the Z direction. The insulator 235 is any electrically insulating material. For example, the insulator 235 may be rubber or plastic. In some implementations, the insulator 235 is an air gap between the piston and the activation assembly 233 and is not a separate component.

The disconnect 230 also includes a disconnection conductor 237. During ordinary operation (FIG. 2A), the locking assembly 238 holds the disconnection conductor 237 in a first position. When the disconnection conductor 237 is held in the first position, the disconnection conductor 237 extends through the first end 226 of the housing 221, and the disconnection conductor 237 is electrically connected to the electrically conductive body 234 and to the piston 236. Referring also to FIG. 2C, the disconnection conductor 237 is an electrically conductive cylinder or rod that includes a recess 244. The locking assembly 238 holds the disconnection conductor 237 in the first position (FIGS. 2A and 2B) with protruding tabs or blocks that are inserted into the recess 244.

FIG. 2A shows the energy-limiting device 210 during ordinary, steady-state operation. Electrical current flows through the energy-limiting 210 along a current path depicted with a dashed line. During ordinary, steady-state operation, the electrical current that flows in the energy-limiting device 210 is much smaller than the rated interruption current of the current interrupter 220. For example, during ordinary, steady-state operation, the current may be two or more orders of magnitude less than the interruption current of the current interrupter 220.

Electrical current flows in the fusible element 224 and into the activation assembly 233. The piston 236 is insulated from the activation assembly 233 by the insulator 235, and the electrical current flows from the activation assembly 233 into the electrically conductive body 234. The disconnection conductor 237 is held in the first position by the locking assembly 238, and the disconnection conductor 237 is in contact with the electrically conductive body 234. Thus, electrical current flows from the electrically conductive body 234 and into the disconnection conductor 237. The current flows into the conductor 107 to the node 103.

FIG. 2B shows the energy-limiting device 210 immediately after a fault condition has occurred but before the electrical current flowing to the energy-limiting device 210 exceeds the interruption rating of the current interrupter 220. The electrical current that flows in the energy-limiting device 210 under the situation illustrated in FIG. 2B is greater than during ordinary operation but is still less than the rated current of the current interrupter 220. The current path is shown with a dotted line. The electrical current flows in the fusible element 224 and into the activation assembly 233. The insulator 235 separates the activation assembly 233 from the piston 236 in the Z direction and forms a spark gap between the activation assembly 233 and the piston 236. The spark gap is associated with a spark voltage that depends on the distance in the Z direction between the activation assembly 233 and the piston 236 and the breakdown voltage of the insulator 235. When the potential difference between the activation assembly 233 and the piston 236 exceeds the spark voltage, an arc forms between the activation assembly 233 and the piston 236. The impedance of the arc is much lower than the impedance of the path to the electrically conductive body 234, and all or substantially all of the electrical current flows from the activation assembly 233 into the piston 236. The electrical current flows from the piston 236 into the disconnection conductor 237, which is held in the first position by the locking assembly 238.

The arc generates heat and gas, which causes the activation mechanism 239 to release hot gas or explode, causing the piston 236 to move in the bore 240 in the –Z direction. The arc and the current level in the arc may be considered a threshold current, where currents at or above the threshold current cause the activation mechanism 239 to explode and the piston 236 to move in the –Z direction. Referring also to FIG. 2C, the moving piston 236 pushes the locking assembly 238 and causes the locking assembly 238 to move radially outward and away from the recess 244. As a result, the disconnect conductor 237 is released and drops out of the energy-limiting device 210. Because the disconnect conductor 237 is separated from the piston 236 and the electrically conductive body 234, the current path through the energy-limiting device 210 is interrupted and the node 103 is disconnected. The piston 236 remains in the bore 240, and the disconnect 230 is not ejected from the housing 221. Neither the energy-limiting device 210 nor the disconnect 230 break apart. The disconnect conductor 237 is the only item that falls from the energy-limiting device 210.

Figure 5:
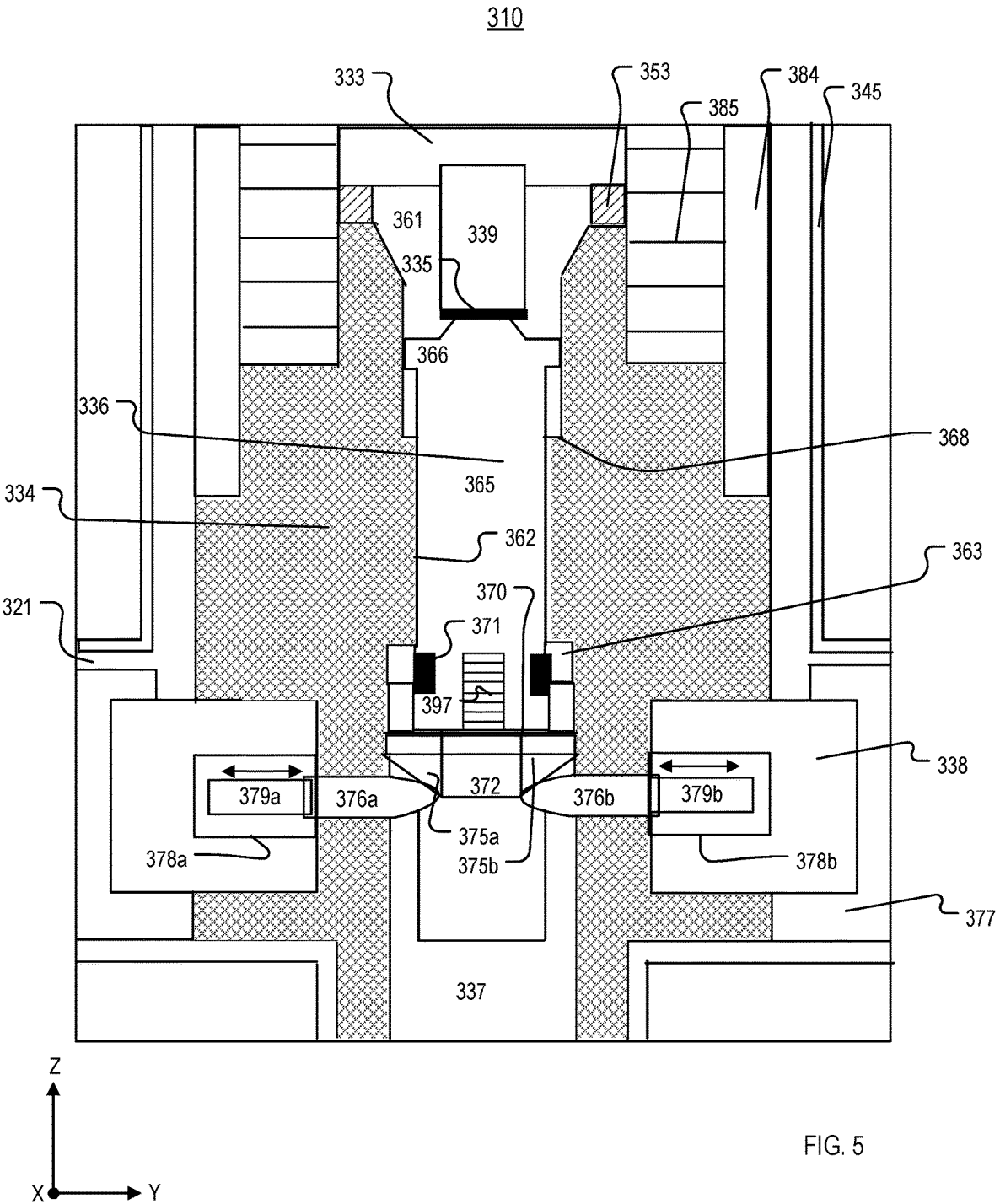
FIG. 5 is a more detailed cross-sectional view of a portion of the energy-limiting device of FIG. 3.

FIG. 3 is a cross-sectional view of an energy-limiting device 310 that includes a current interrupting device 320 and a disconnect 330. FIG. 5 is a more detailed cross-sectional view of a portion of the energy-limiting device 310.

The current interrupting device 320 includes a housing 321. The housing 321 is a hollow cylindrical body that extends in the Z direction from a first end 326 to a second end 327 and has a circular cross-section in the X-Y plane. The current interrupting device 320 also includes endcaps 328A and 328B. The endcap 328A is attached to and covers the first end 326, and the endcap 328B is attached to and covers the second end 327. The housing 321 and endcaps 328A, 328B define an interior space 322. The endcaps 328A and 328B are electrically conductive and may include terminals (not shown) to facilitate electrical connection of the energy-limiting device 310 to external devices or nodes.

The current interrupting device 320 also includes four fuse mounting elements 323 in the interior space 322, three of which are shown in FIG. 3 and only one of which is labeled. The fuse mounting elements 323 extend from the first end 326 to the second end 327 and are used to support electrically conductive fusible elements (not shown). For example, one or more ribbons of electrically conductive material may be wound in a spiral or helix around the fuse mounting elements 323. The interior space 322 may be partially or completely filled with an arc-quenching or arc-suppressing material such as sand or quartz.

The disconnect 330 includes a housing 331 that is in the interior space 322. The housing 331 has an outer surface 345, a first portion 346, and a second portion 347 that extends from the first portion 346 in the Z direction to an end 348. The first portion 346 and the second portion 347 have circular cross-sections in the X-Y plane. The diameter of the first portion 346 is greater than the diameter of the second portion 347. The outer surface 345 includes a conductive element 349. The conductive element 349 may be a conductive coating that is on the outer surface 345 or a separate conductive element (such as one or more wires) that is attached to the outer surface 345. The conductive element 349 may be any type of electrically conductive material. For example, the conductive element 349 may be a metal or a metal alloy. Examples of metals and metal alloys include, without limitation, copper, brass, gold, and silver. The fusible element or elements are electrically connected to a terminal on the endcap 328B and to the conductive element 349.

The disconnect 330 also includes a terminal 350 that extends through the end 348 of the housing 331 in the Z direction. The terminal 350 is made of an electrically conductive material and is electrically connected to the conductive element 349. For example, the terminal 350 may be placed in direct contact with the conductive element 349. The terminal 350 is attached to an activation assembly 333, which is in the second portion 347 of the housing 331. The activation assembly 333 is made of an electrically conductive material such as, for example, brass. The activation assembly 333 and the conductive element 349 are in physical contact and are electrically connected due to the physical contact.

The activation assembly 333 defines a recess or cavity 351 that is open at an end 352 of the activation assembly 333. The cavity 351 holds an activation mechanism 339. The activation mechanism 339 is any type of mechanism or element that expands, emits gases, explodes, or breaks apart in response to heating. In the example of FIG. 3, the activation mechanism 339 is an electrically conductive shell or cartridge that extends out of the activation assembly 333 and the cavity 351 in the –Z direction. The shell or cartridge may be filled with an explosive powder or fluid, or the shell may be filled with air or another gas.

The activation mechanism 339 also includes a resistive ring 353 (shown with diagonal shading in FIGS. 3, 4A, 4B, and 5). The resistive ring 353 is made of any type of electrically resistive material. Examples of materials that may be used for the resistive ring 353 include, without limitation, carbon composites, ceramics, metal films, nichrome, and silicon carbide. The resistive ring 353 may be, for example, a ceramic resistor, a carbon composite resistor, a metal film resistor, a nichrome resistor, or a silicon carbide resistor.

Figure 4A:
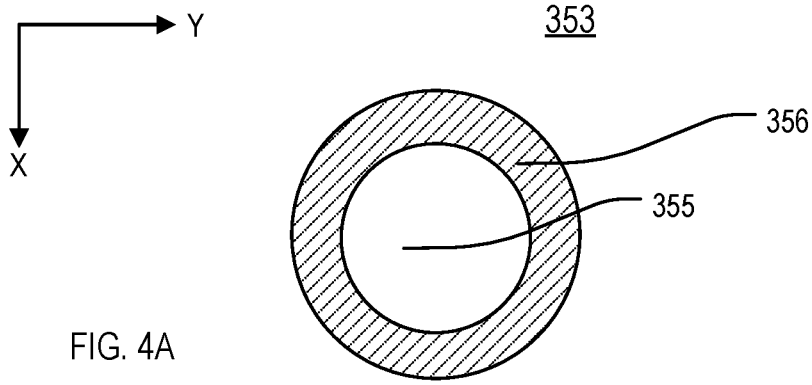
FIGS. 4A and 4B show an example of a resistive ring.
Figure 4B:
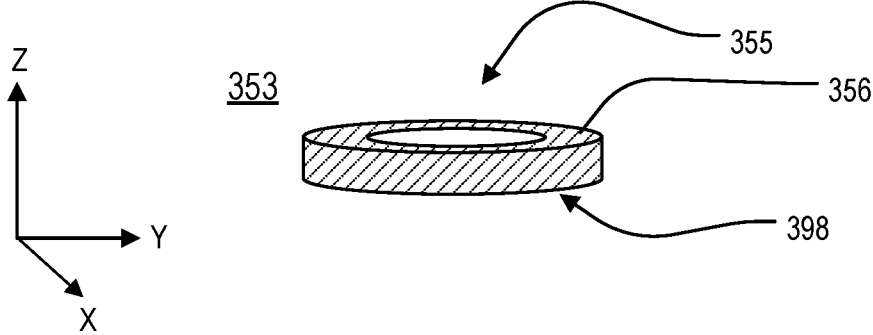

The resistive ring 353 is shown with diagonal shading in FIG. 3. Referring also to FIGS. 4A and 4B, the resistive ring 353 is an annulus with a circular cross-section in the X-Y plane. The resistive ring 353 includes a body 356 that extends in the Z direction from an end 398 to an end 354 and an opening 355 that passes through the body 356 in the Z direction. The end 354 of the resistive ring 353 is attached to the end 352 of the activation assembly 333. The activation mechanism 339 extends through the opening 355 and does not make direct physical contact with the resistive ring 353.

The disconnect 330 also includes an electrically conductive body 334 (shown with diamond cross hatch shading in FIGS. 3 and 5). The electrically conductive body 334 is a solid piece of electrically conductive material. The electrically conductive body 334 may be made of any type of electrically conductive material, such as, for example, brass or copper. The electrically conductive body 334 is symmetrical about the Z axis and has a cross-sectional shape that allows for placement in the interior space 332 and relative to other components of the disconnect 330. The electrically conductive body 334 extends in the Z direction from an end 357 to an end 358, with a portion 359 at the end 357 extending through the endcap 328A. The end 358 makes physical contact with the end 398 of the resistive ring 353. The electrically conductive body 334 defines a recess 361 (FIG. 5) that is open at the end 358. The electrically conductive body 334 also defines a bore 362. The recess 361 and the bore 362 have circular cross-sections in the X-Y plane, and the bore 362 has a smaller diameter in the X-Y plane than the recess 361. The recess 361 and the bore 362 are connected, and there is a shelf or shoulder 368 at the interface of the recess 361 and the bore 362. The electrically conductive body 334 also defines an open ring region 363 (FIG. 5). The open ring region 363 has a larger diameter in the X-Y plane than the bore 362.

The disconnect 330 also includes a piston 336. The piston 336 is a separate and distinct element and is not part of the conductive body 334, the activation mechanism 339, or the activation assembly 333. The piston 336 includes a base portion 365 that extends in the Z direction from an end 370 to a flange 366. The base portion 365 and the flange 366 have circular cross-sections in the X-Y plane. The flange 366 has a greater diameter in the X-Y plane than the base portion 365. The flange 366 is in the recess 361. At least part of the base portion 365 is in the bore 362 and the base portion 365 moves in the bore 362 in the +Z and/or –Z directions. The diameter of the flange 366 in the X-Y plane is greater than the diameter of the bore 362 such that the shoulder 368 prevents the flange 366 from entering the bore 362. The piston 336 is made of an electrically conductive material such as a metal (for example, gold, silver, or copper), or a metal alloy (for example, brass).

Figure 6A:
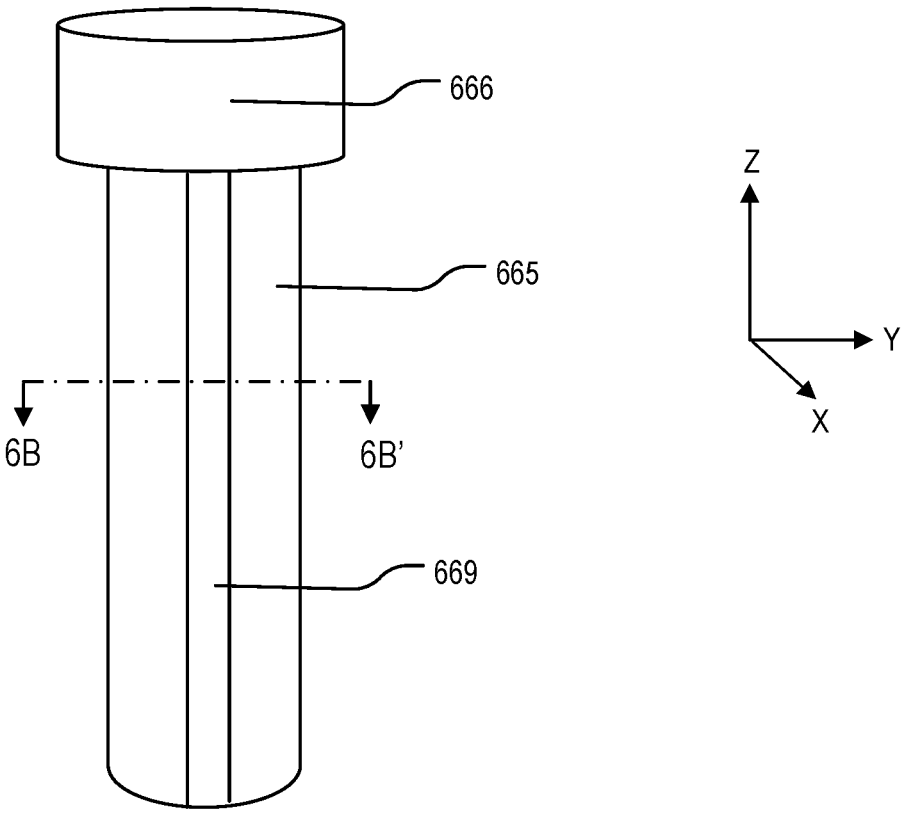
FIG. 6A is a perspective view of an example of a piston.
Figure 6B:
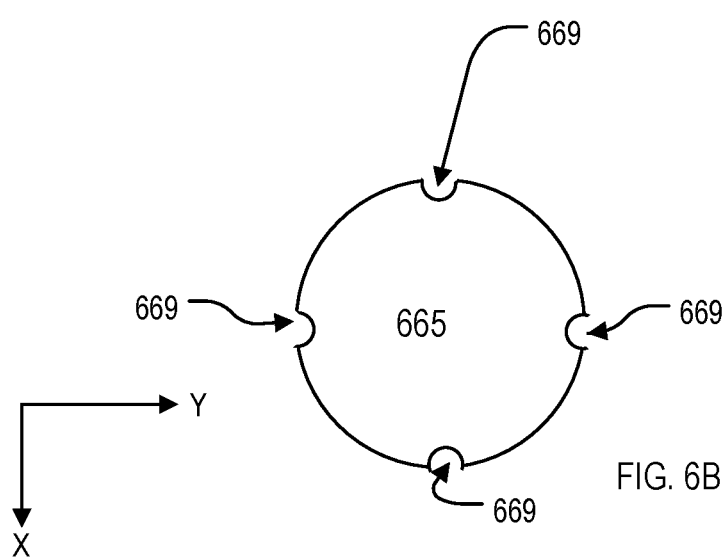
FIG. 6B is a cross-sectional view of the piston of FIG. 6A.

In some implementations, the base portion 365 includes surface features. FIGS. 6A and 6B provide an example of such an implementation. FIG. 6A is a perspective view of a piston 636 and FIG. 6B is a cross-sectional view of the piston 636 taken along the line 6B-6B'. The piston 636 is another implementation of the piston 336, and the piston 636 may be used in the disconnect 330 instead of the piston 336. The piston 636 includes a base portion 665 and a flange 666. The base portion 665 includes surface channels 669 that extend in the Z direction. The surface channels 669 are recesses or channels that are formed in the exterior surface of the base portion 665. The base portion 665 includes four surface channels 669. However, the base portion 665 may include more or fewer surface channels. Referring again to FIGS. 3 and 5, in implementations in which the base portion 365 includes the surface channels 669, the surface channels 669 fluidly connect the open ring region 363 and the recess 361. In other words, gas may flow between the open ring region 363 and the recess 361 via the surface channels 669.

A friction element 371 (FIG. 5) surrounds the piston 336 near the open ring region 363. The friction element 371 provides additional friction between the bore 362 and the piston 336. The friction element 371 may be a rubber or polymer ring. For example, the friction element 371 may be an O-ring.

The activation mechanism 339 extends through the opening 355 of the resistive ring 353 and the recess 361. The activation mechanism 339 does not make direct contact with the electrically conductive body 334 or the resistive ring 353. The activation mechanism 339 is separated from the flange 366 of the piston 336 in the Z direction by an insulator 335 (shown in black shading in FIGS. 3 and 5). The insulator 335 is any type of electrically insulator. For example, the insulator 335 may be a polymer disk or block. In some implementations, the insulator 335 is air and there is an empty gap between the activation mechanism 339 and the flange 366. The dielectric breakdown properties and the extent of the insulator 335 in the Z direction determine a spark gap voltage between the activation assembly 333 and the piston 336. When the magnitude of the potential difference between the activation assembly 333 and the piston 336 exceeds the spark gap voltage, an arc forms and electrically connects the activation assembly 333 and the piston 336. When the potential difference is less than the spark gap voltage, the insulator 335 insulates the activation assembly 333 from the piston 336. Current does not flow between the activation assembly 333 and the piston 336 when the magnitude of the potential difference is less than the spark gap voltage.

The piston 336 includes an attachment bore 397 at the end 370. The attachment bore 397 is used to hold a locking tip 372 to the end 370. For example, the attachment bore 397 is shown as a threaded bore and the locking tip 372 is attached onto the end 370 with a screw. FIG. 7 is a perspective view of the locking tip 372. The locking tip 372 includes a cylindrical body 373 that extends in the Z direction from an end 374a to an end 374b, and flanges 375a and 375b that extend radially outward from the body 373. Each flange 375a, 375b has a respective sloping section 392a, 392b such that the flanges 375a, 375b are wider in the Y-Z plane at the end 374a than at the end 374b. The end 374a is attached to the end 370 of the piston 336.

The locking tip 372 may be made of an electrically conductive material or a material that is not electrically conductive. For example, the locking tip 372 may be made of a metal or metal alloy, or a polymer material that is non-conductive or semi-conductive. Specific examples of materials that may be used for the locking tip 372 include, without limitation, brass, gold, steel, stainless steel, and plastic.

Referring again to FIGS. 3 and 5, the disconnect device 330 also includes a disconnection conductor 337 and a locking assembly 338. As discussed below, the locking assembly 338 includes release mechanisms 376a and 376b that hold the disconnection conductor 337 in the position shown in FIGS. 3 and 5 and are operable to release the disconnection conductor 337. The locking assembly 338 is in the interior space 332. The locking assembly 338 may include external threads that screw into corresponding threads on the conductive body 334 so that the locking assembly 338 is attached to the conductive body 334. The locking assembly 338 is adjacent to a void 377 that is in the first portion 346 of the housing 321. The void 377 is filled with sand or another quenching material. The locking assembly 338 defines bores 378a and 378b, each of which includes a respective spring 379a and 379b (FIG. 5). The springs 379a and 379b are positioned in the bores 378a and 378b such that they expand and contract along the Y axis. The release mechanism 376a is coupled to the spring 379a. The release mechanism 376b is coupled to the spring 379b.

Figure 8:
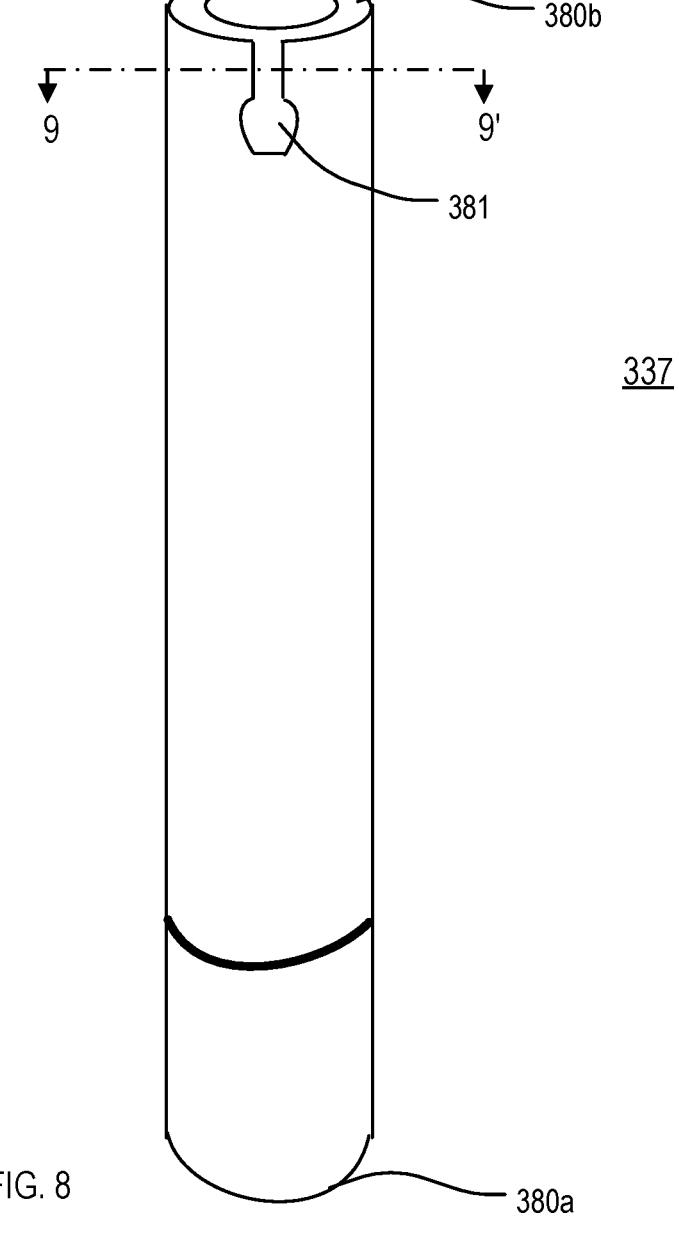
FIG. 8 is a perspective view of an example of a disconnection conductor.
Figure 9:
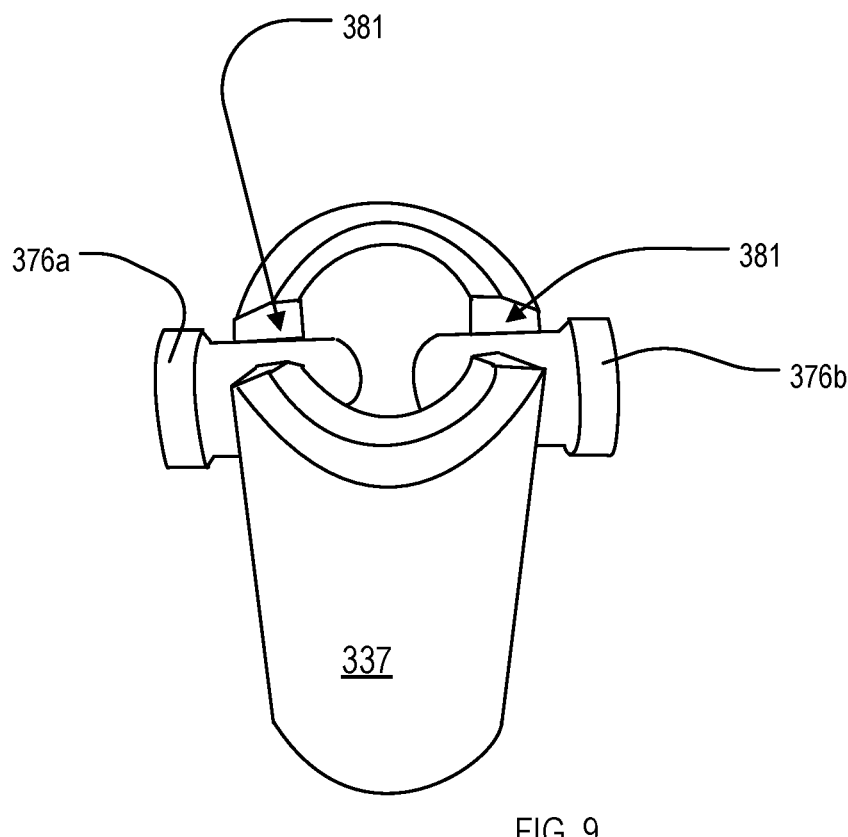
FIG. 9 is a perspective cross-sectional view of the disconnection conductor of FIG. 8.
Figure 10:
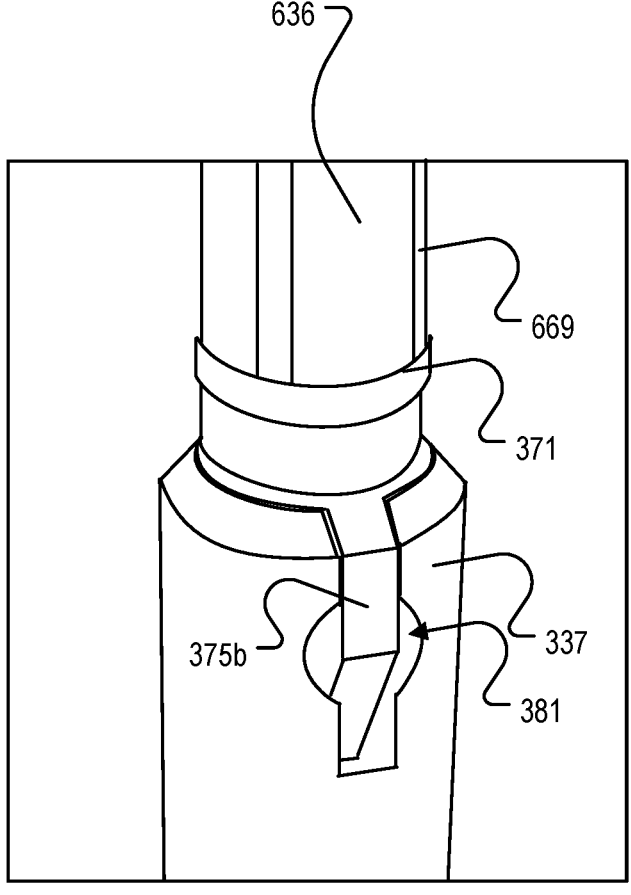
FIG. 10 is a partial perspective view of the piston of FIGS. 6A and 6B and the disconnection conductor of FIG. 8.

FIGS. 8-10 show additional details of the disconnection conductor 337 and the release mechanisms 376a, 376b. FIG. 8 is a perspective view of the disconnection conductor 337. The disconnection conductor 337 is an electrically conductive cylindrical body that extends in the Z direction from an end 380a to an end 380b. The end 380a is configured for connection to the node 103 (FIG. 1). The end 380a may include surface features, such as threads. The implementation shown in FIG. 8 does not include threads or other surface features at the end 380a.

The disconnection conductor 337 includes openings at the end 380b that each extend radially through the disconnection conductor 337. The implementation shown in FIG. 8 includes two openings 381, only one of which is visible in FIG. 8. The other opening 381 is on the opposite side of the disconnection conductor 337. Each opening 381 is configured to receive one of the release mechanisms 376a, 376b (FIG. 5).

FIG. 9 is a perspective cross-sectional view of the disconnection conductor 337 taken along line 9-9' of FIG. 8. FIG. 9 also shows the release mechanisms 376a and 376b extending into the openings 381. When the release mechanisms 376a and 376b extend into the openings 381 (as shown in FIG. 9), the release mechanisms 376a and 376b hold the disconnection conductor 337 in the position shown in FIGS. 3 and 5.

FIG. 10 is a partial perspective view of the piston 636 and the disconnection conductor 337 after the release mechanisms 376a and 376b have been pushed into the respective bores 378a and 378b (FIG. 5) by the locking tip 372. When the release mechanisms 376a and 376b are pushed into the respective bores 378a and 378b, the disconnection conductor 337 is released from the locking mechanism and exits the disconnect 330.

Referring again to FIGS. 3 and 5, the disconnect 330 also includes a retention structure 384 that is seated in the inner wall of the housing 321. The retention structure 384 provides additional structural support for the disconnect device 330 and helps to prevent the disconnect 330 from breaking apart during or after the triggering of the activation mechanism 339.

The retention structure 384 surrounds the resistive ring 353, the activation assembly 333, part of the conductive body 334, and part of the terminal 350. The space between the retention structure 384 and these elements is filled with a potting material or a gripping material such as, for example, epoxy resin or another type of material that forms a solid structure or solid block when cured. The retention structure 384 includes inward-oriented surface features 385 that face the elements surrounded or partially surrounded by the retention structure 384. The surface features 385 engage with the potting material and increase the strength of the bond between the potting material and the retention structure 384. In the example shown in FIGS. 3 and 5, the surface features are ridges. However, any type of surface feature may be used. For example, the surface features 385 may be holes, patches of relatively rougher texture (for example, scored patches), or a combination of such features.

The energy-limiting device 310 also includes an arc-snuffing structure 388 (FIG. 3). The arc-snuffing structure 388 is a tube that is connected to the portion 359 of the electrically conductive body 334 that extends through the endcap 328A. The arc-snuffing structure 388 extends away from the endcap 328A and surrounds the disconnection conductor 337. For example, the arc-snuffing structure 388 may be a tube that has a threaded end (not shown) that mates with a corresponding threaded end (not shown) on the portion 359. In another example, the arc-snuffing structure 388 is a tube that is permanently bonded to the portion 359 with, for example, and adhesive.

The arc-snuffing structure 388 is hollow and may be made of any non-conductive material. For example, the arc-snuffing structure 388 may be a fiberglass tube or a plastic tube. The space between the arc-snuffing structure 388 and the disconnection conductor 337 is filled with a fire-suppressing material 389 (shown with dotted shading in FIG. 3). Any type of fire-suppressing material may be used. The fire-suppressing material 389 may be in any form. For example, the fire-suppressing material 389 may be a liquid, a gas, foam, a paint or coating, a solid, and/or a plasma. Moreover, more than one distinct fire-suppressing material 389 may be in the arc-snuffing structure 388 at the same time. Specific examples, of the fire-suppressing material 389 include, without limitation, boric acid, potassium carbonate, potassium carbonate (anhydrous), and intumescents that swell to produce a light char when heated. The light char may be a microporous foam formed by a chemical reaction of three main components: ammonium polyphosphate, pentaerythritol and melamine.

In some implementations, the arc-snuffing structure 388 itself includes an additional fire-suppressing material. For example, the arc-snuffing structure 388 may be a fiberglass tube impregnated and/or coated with an arc-suppressing material such as, for example, melamine. The arc-snuffing structure 388 may be used with or without the fire-suppressing material 389.

An example of the operation of the energy-limiting device 310 is discussed next. In operational use, a terminal on the endcap 328B is electrically connected to the surge arrester 190 (FIG. 1) and the disconnection conductor 337 is electrically connected to the node 103. The node 102 is electrically connected to a terminal at the endcap 328B and to a fusible element in the interior 322. The fusible element is electrically connected to the terminal 350 of the disconnect 330.

Under ordinary, steady-state operating conditions, the locking assembly 338 holds the disconnection conductor 337 in contact with the electrically conductive body 334 as shown in FIGS. 3 and 5. Electrical current flows in the terminal 350 to the activation assembly 333. The current is relatively small. For example, the current that flows in the energy-limiting device 310 under ordinary, steady state operating conditions may be 1 milliamp (mA) or less. In another example, the current may be two or more orders of magnitude smaller than the rated current of the current interrupter 220.

The potential difference between the activation mechanism 339 and the piston 336 is below the spark gap voltage determined by the properties of the insulator 335. For example, the insulator 335 may be configured such that the spark gap voltage is 3 kV, 3.5 kV, or greater than 3.5 kV depending on the application. Under ordinary, steady-state operating conditions, the magnitude of the potential difference between the activation assembly 333 and the piston 336 current does not exceed the spark gap voltage, and the insulator 335 provides an infinite impedance between the piston 336 and the activation assembly 333. As a result, current does not flow between the activation mechanism 339 and the piston 336. Instead, the current in the activation assembly 333 flows into the relatively lower impedance path presented by the resistive ring 353. The impedance of the resistive ring 353 may be ones or tens of kiloOhms (kΩ), for example. The current flows in the resistive ring 353, to the conductive body 334, and into the disconnection conductor 337.

The current that flows in the energy-limiting device 310 increases after a fault occurs, and an arc forms between the activation mechanism 339 and the piston 336 after the current increases to a level determined by the properties of the resistive ring 353 and/or the insulator 335. The arc forms at a current that is lower than the rated current of the current interrupter 320. For example, if the spark voltage is 3.5 kV and the resistance of the resistive ring 353 is 3.5 kΩ, the arc forms when the current exceeds 1 A. The arc electrically connects the piston 336 and the activation mechanism 339. Furthermore, the impedance of the arc is very low and is much less than the impedance of the resistive ring 353. For example, the impedance of the arc may be about 1Ω and the impedance of the resistive ring 353 is ones or tens of kilo Ohms (kΩ). As a result, although a small portion of the current in the activation assembly 333 may continue to flow into the resistive ring 353, most of the current in the activation assembly 333 flows into the piston 336 through the activation mechanism 339 and the arc.

When the arc is initially formed, the piston 336 remains in the position shown in FIG. 3, and is held in the bore 362 by friction between the bore 362 and the base portion 365 of the piston 336. The friction element 371 provides an additional frictional engagement between the base portion 365 and the bore 362. In implementations in which the piston 336 includes surface features (such as the channels 669 show in FIGS. 6A and 6B), the surface features vent the gas in the recess 361 to the open ring region 363.

The arc creates heat. The heat from the arc causes the activation mechanism 339 to explode or emit hot gas and/or plasma. Moreover, the arc itself generates additional hot gasses and/or plasma by vaporizing metal in the vicinity. The gases and/or plasma are in the volume of the recess 361 while expanding and therefore create a force on the piston 336. The force of the hot gas and/or plasma pushes the piston 336 in the −Z direction until the flange 366 engages with the shoulder 368. The base portion 365 moves in the bore 362 in the −Z direction but is not ejected from the bore 362. The locking tip 372, which is connected to the base portion 365 of the piston 336, moves in the −Z direction with the piston 336. The sloping section 392a, 392b of the flange 375a, 375b makes contact with the respective release mechanism 376a, 376b. As the locking tip 372 moves in the −Z direction, the width of the locking tip 372 increases. Specifically, as the sloping section 392a moves in the −Z direction, it pushes the release mechanism 376a in the −Y direction such that the spring 379a is compressed and the release mechanism retracts into the bore 378a and out of the opening 381. As the sloping section 392b moves in the −Z direction, it pushes the release mechanism 376b in the Y direction such that the spring 379b is compressed and the release mechanism 376b retracts into the bore 378b and out of the opening 381. After the release mechanisms 376a and 376b are removed from the openings 381, the disconnection conductor 337 is released from the locking mechanism 338 and separates from the electrically conductive body 334. An arc may form between the end 380b of the disconnection conductor 337 and the electrically conductive body 334.

The disconnection conductor 337 is surrounded by the fire-suppressing material 389 and the arc-snuffing structure 388. After the locking mechanism 338 releases the disconnection conductor 337, the disconnection conductor 337 travels through the open interior of the arc-snuffing structure 388 and the fire-suppressing material 389. The fire-suppressing material 389 and/or the arc-snuffing structure 388 extinguishes or quenches the arc that may form at the end 380a prior to the disconnect conductor 337 exiting the arc-snuffing structure 399. Thus, when the disconnect conductor 337 exits the energy-limiting device 310, it is unlikely to ignite other objects. Furthermore, the separated disconnect conductor 337 provides a visible indication that the energy-limiting device 310 has operated.

No other components of the disconnect 330 exit the energy-limiting device 310 when the disconnect 330 operates. The components of the disconnect 330 are retained in the housing 331 by the retention structure 384 and/or by the housing 321 of the current interrupter 320. The housing 331 of the disconnect 330 remains intact and is not broken into pieces.

The disconnect 330 interrupts the current in the energy-limiting device 310 at a current that is lower than the rated current of the current interrupter 320 and before the current interrupter 320 generates significant sparks. The disconnect 330 does not generate significant sparking upon operation, does not break apart, and also provides a visible break indicator.

These and other implementations are within the scope of the claims. For example, the disconnection conductor 337 may have more or fewer openings 381 and the locking mechanism 338 may correspondingly have more or fewer release mechanisms.

Figure 11:
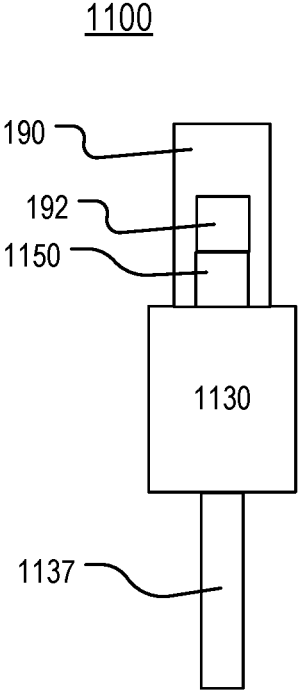
FIG. 11 is a block diagram of an example of a system that includes a surge arrester and an energy-limiting device.

FIG. 11 is a block diagram of a system 1100 that includes the surge arrester 190 and a disconnect 1130. The disconnect 1130 is an energy-limiting device and is not in a fuse housing (such as the fuse housing 221 of FIGS. 2A-2C). The disconnect 1130 is mounted to the surge arrester 190, by, for example, screws, bolts, and/or a bonding material. The disconnect 1130 includes a terminal 1150 that is electrically connected directly to the electrical component 192 of the surge arrester 190. The disconnect 1130 and the surge arrester 190 are in series with each other.

Figure 12:
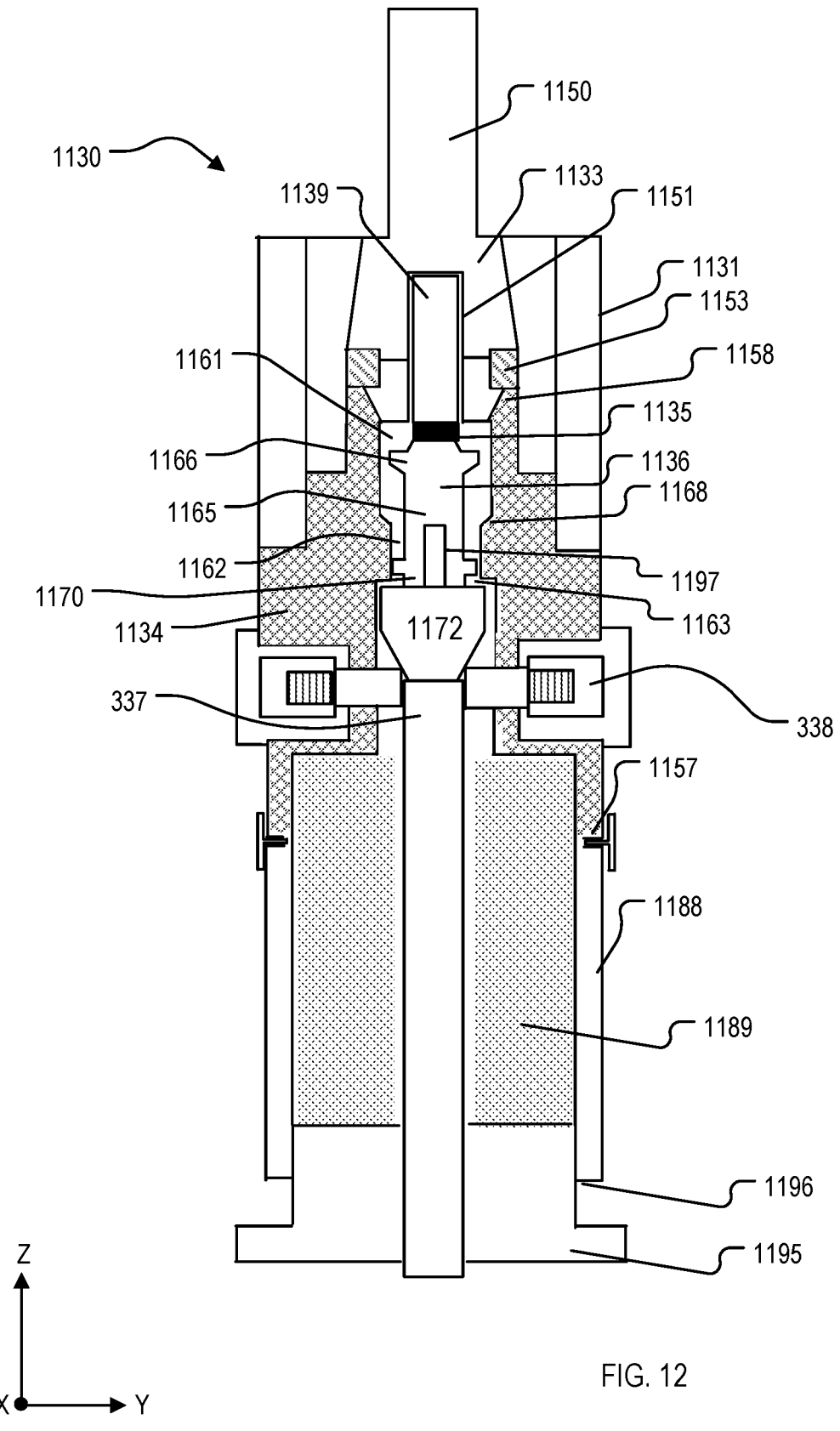
FIG. 12 is a cross-sectional view of another example of a disconnect.

FIG. 12 is a cross-sectional view of the disconnect 1130. The disconnect 1130 is similar to the disconnect 330 discussed above, and the disconnect 1130 includes the locking assembly 338 and the disconnection conductor 337. Moreover, many other components of the disconnect 330 may be used in the disconnect 1130.

The disconnect 1130 includes a housing 1131 and a terminal 1150 accessible from an exterior of the housing 1131. The housing 1131 is made of a strong and supportive material. For example, the housing 1131 may be made of an electrically insulating material, such as, for example, ceramic or a polymer, or of an electrically conducting material such as aluminum. The terminal 1150 is made of an electrically conductive material, such as, for example, copper or brass. The terminal 1150 includes a terminal block portion 1133 that is made of an electrically conductive material such as, for example, copper or brass. The terminal 1150 and the terminal block portion 1133 are in physical and electrical contact with each other and may be a single piece of the electrically conductive material.

The terminal block portion 1133 defines a recess or cavity 1151 that is open to a recess 1161. The cavity 1151 holds an activation mechanism 1139. The activation mechanism 1139 is any type of mechanism or element that expands, emits gases, explodes, or breaks apart in response to heating. In the example of FIG. 12, the activation mechanism 1139 is an electrically conductive shell or cartridge that extends out of the terminal block portion 1133 and the cavity 1151 in the −Z direction. The shell or cartridge may be filled with an explosive powder or fluid, or the shell may be filled with air or another gas. The activation mechanism 339 (FIGS. 3 and 5) may be used as the activation mechanism 1139, for example.

A resistive ring 1153 (shown with diagonal shading) surrounds the portion of the activation mechanism 1139. The resistive ring 1153 is made of any type of electrically resistive material. Examples of materials that may be used for the resistive ring 1153 include, without limitation, carbon composites, ceramics, metal films, nichrome, and silicon carbide. The resistive ring 1153 may be, for example, a ceramic resistor, a carbon composite resistor, a metal film resistor, a nichrome resistor, or a silicon carbide resistor. The resistive ring 1153 is an annulus with a circular cross-section and a central opening in the X-Y plane. The resistive ring 353 (FIGS. 3, 4A, 4B, and 5) may be used as the resistive ring 1153.

The disconnect 1130 also includes an electrically conductive body 1134 (shown with diamond cross hatch shading). The electrically conductive body 1134 is a solid piece of electrically conductive material. The electrically conductive body 1134 may be made of any type of electrically conductive material, such as, for example, brass or copper. The electrically conductive body 1134 is symmetrical about the Z axis.

The electrically conductive body 1134 extends in the Z direction from an end 1157 to an end 1158. The end 1158 makes physical contact with the resistive ring 1153. The electrically conductive body 1134 defines the recess 1161, which is open at the end 1158. The electrically conductive body 1134 also defines a bore 1162. The recess 1161 and the bore 1162 have circular cross-sections in the X-Y plane, and the bore 1162 has a smaller diameter in the X-Y plane than the recess 1161. The recess 1161 and the bore 1162 are connected, and there is a shelf or shoulder 1168 between the recess 1161 and the bore 1162. The electrically conductive body 1134 also defines an open ring region 1163. The open ring region 1163 has a larger diameter in the X-Y plane than the bore 1162.

The disconnect 1130 also includes a piston 1136. The piston 1136 is a separate and distinct element and is not part of the conductive body 1134, the activation mechanism 1139, or the terminal block portion 1133. The piston 1136 includes a base portion 1165 that extends in the Z direction from an end 1170 to a flange 1166. The base portion 1165 and the flange 1166 have circular cross-sections in the X-Y plane. The flange 1166 has a greater diameter in the X-Y plane than the base portion 1165. The flange 1166 is in the recess 1161. At least part of the base portion 1165 is in the bore 1162 and the base portion 1165 can move in the bore 1162 along the Z axis. The diameter of the flange 1166 in the X-Y plane is greater than the diameter of the bore 1162 such that the shoulder 1168 prevents the flange 1166 from entering the bore 1162. The piston 1136 is made of an electrically conductive material such as a metal (for example, gold, silver, or copper), or a metal alloy (for example, brass). Additionally, any of the pistons 236, 336, 636 discussed above may be used as the piston 1136.

A friction element surrounds the piston 1136 near the open ring region 1163. The friction element is not shown in FIG. 12 but may be similar to the friction element 371 shown in FIG. 5. The friction element provides additional friction between the bore 1162 and the piston 1136. The friction element may be a rubber or polymer ring. For example, the friction element may be an O-ring.

The activation mechanism 1139 extends through the opening of the resistive ring 1153 and into the recess 1161. The activation mechanism 1139 does not make direct contact with the electrically conductive body 1134 or the resistive ring 1153. The activation mechanism 1139 is separated from the flange 1166 of the piston 1136 in the Z direction by an insulator 1135 (shown in black shading). The insulator 1135 is any type of electrically insulator. For example, the insulator 1135 may be a polymer disk or block. In some implementations, the insulator 1135 is air and there is an empty gap or void space between the activation mechanism 1139 and the flange 1166.

The dielectric breakdown properties and the extent of the insulator 1135 in the Z direction determine a spark gap voltage between the terminal block portion 1133 and the piston 1136. When the magnitude of the potential difference between the terminal block portion 1133 and the piston 1136 exceeds the spark gap voltage, an arc forms and electrically connects the terminal block portion 1133 and the piston 1136. When the potential difference is less than the spark gap voltage, the insulator 1135 insulates the terminal block portion 1133 from the piston 1136. Current does not flow between the terminal block portion 1133 and the piston 1136 when the magnitude of the potential difference is less than the spark gap voltage.

The piston 1136 includes an attachment bore 1197 at the end 1170. The attachment bore 1197 is used to hold a locking tip 1172 to the end 1170. For example, the attachment bore 1197 may be a threaded bore and the locking tip 1172 is attached onto the end 170 with a screw. The locking tip 1172 may be the same as the locking tip 372 discussed above.

The disconnect 1130 also includes the disconnection conductor 337 and the locking assembly 338, which are discussed above with respect to FIGS. 3 and 5.

The end 1157 of the conductive body 1134 is attached to an arc-snuffing structure 1188. In the example shown, the arc-snuffing structure 1188 is attached to the end 1157 with fasteners but other implementations are possible. For example, the arc-snuffing structure 1188 may be press-fit to the end 1157, threaded onto the end 1157, and/or attached to the end 1157 with a bonding material.

The arc-snuffing structure 1188 is a hollow tube or conduit made of any non-conductive material. For example, the arc-snuffing structure 1188 may be a fiberglass tube or a plastic tube. The space between the arc-snuffing structure 1188 and the disconnection conductor 337 is filled with a fire-suppressing material 1189 (shown with dotted shading).

Any type of fire-suppressing material may be used as the fire-suppressing material 1189. The fire-suppressing material 1189 may be in any form. For example, the fire-suppressing material 1189 may be a liquid, a gas, foam, a paint or coating, a solid, and/or a plasma. In some implementations, the fire-suppressing material 1189 is pre-formed by pressing or compressing a powder into a cylinder shape or into a plurality of discrete rings that are stacked into a cylinder. The pre-formed cylinder of fire-suppressing material 1189 is then inserted into the structure 1188. Moreover, more than one distinct fire-suppressing material 1189 or more than one form of the material 1189 may be in the arc-snuffing structure 1188 at the same time. A plug or stopper 1195 is inserted into an end 1196 of the arc-snuffing structure 1188 to hold the fire-suppressing material 1189 in the structure 1188.

Specific examples, of the fire-suppressing material 1189 include, without limitation, boric acid, potassium carbonate, potassium carbonate (anhydrous), and intumescents that swell to produce a light char when heated. The light char may be a microporous foam formed by a chemical reaction of three main components: ammonium polyphosphate, pentaerythritol and melamine.

In some implementations, the arc-snuffing structure 1188 itself includes an additional fire-suppressing material. For example, the arc-snuffing structure 1188 may be a fiberglass tube impregnated and/or coated with an arc-suppressing material such as, for example, melamine. The arc-snuffing structure 1188 may be used with or without the fire-suppressing material 1189.

Figure 13:
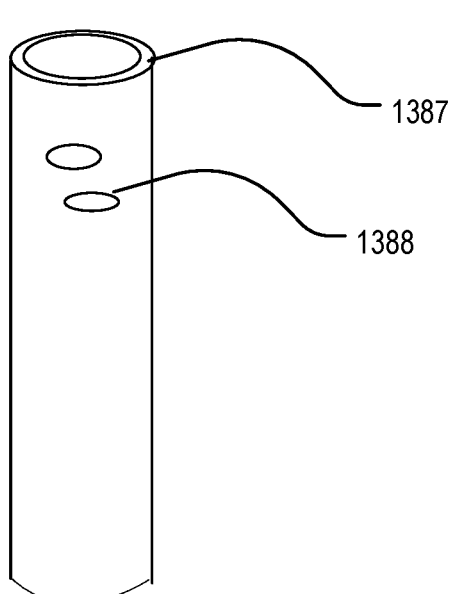
FIG. 13 is a perspective view of an example of an arc-snuffing structure.

Referring also to FIG. 13, which shows an example of a tube 1388 that may be used as the arc-snuffer 1189 or the arc-snuffer 389, in some implementations one or more holes 1394 or weakened regions are intentionally formed in a sidewall 1387 of the tube 1388. In these implementations, all or a portion of the exterior of the sidewall 1387 may be wrapped in a supportive structure, for example, a composite wrap such as a woven fiberglass material. The holes 1394 provide pressure release points to release pressure that may build up in the tube 1388 when high currents (for example, 5 kA and higher) flow in the disconnect conductor 337. The holes 1394 allow hot gases to escape from the interior of the tube 1388 in a controlled manner, thereby reducing or eliminating the risk of the tube 1388 shattering and/or exploding.

An example of the operation of the disconnect 1130 is discussed next.

In operational use, the terminal 1150 and the disconnection conductor 337 are electrically connected to the surge arrester 190 without an additional fuse element between the terminal 1150 and the surge arrester component 192. Under ordinary, steady-state operating conditions, the locking assembly 338 holds the disconnection conductor 337 in contact with the electrically conductive body 1134 as shown in FIG. 12. Electrical current flows in the terminal 1150 to the terminal block portion 1133. This current is relatively small. For example, the current that flows in the terminal 1150 under ordinary, steady state operating conditions may be 1 milliamp (mA) or less. The potential difference between the activation mechanism 1139 and the piston 1136 is below the spark gap voltage determined by the properties of the insulator 1135. As a result, current does not flow between the activation mechanism 1139 and the piston 1136 or between the terminal block 1133 and the piston 1133. Instead, the current in the terminal block 1133 flows into the relatively lower impedance path presented by the resistive ring 1153. The current flows in the resistive ring 1153, to the conductive body 134, and into the disconnection conductor 337.

The current that flows in the arrester 190 increases dramatically after a fault occurs, and an arc forms between the activation mechanism 1139 and the piston 1136 after the current increases to a level determined by the properties of the resistive ring 1153 and/or the insulator 1135. The arc electrically connects the piston 1136 and the terminal block 1133. Furthermore, the impedance of the arc is very low and is much less than the impedance of the resistive ring 1153. As a result, although a small portion of the current in the terminal block portion 1133 may continue to flow into the resistive ring 1153, most of the current in the terminal block portion 1133 flows into the piston 1136 through the activation mechanism 1139 and the arc.

The arc creates heat. The heat from the arc causes the activation mechanism 1139 to explode or emit hot gas and/or plasma. Moreover, the arc itself generates additional hot gasses and/or plasma by vaporizing metal in the vicinity.

The gases and/or plasma are in the volume of the recess 1161 while expanding and therefore create a force on the piston 1136. The force of the hot gas and/or plasma pushes the piston 1136 in the −Z direction until the flange 1166 engages with the shoulder 1168. The base portion 1165 moves in the bore 1162 in the −Z direction but is not ejected from the bore 1162. The locking tip 1172, which is connected to the base portion 1165 of the piston 1136, moves in the −Z direction with the piston 1136. The locking mechanism 338 releases the disconnection conductor 337 as discussed above.

An arc may form between the disconnection conductor 337 and the electrically conductive body 1134 as the conductor 337 moves. However, the disconnection conductor 337 is surrounded by the fire-suppressing material 1189 and the arc-snuffing structure 1188. After the locking mechanism 338 releases the disconnection conductor 337, the disconnection conductor 337 travels through the open interior of the arc-snuffing structure 1188 and the fire-suppressing material 1189. The fire-suppressing material 1189 and/or the arc-snuffing structure 1188 extinguishes or quenches the arc. The exiting disconnect conductor 337 is unlikely to ignite other objects and the arc-snuffing structure 1188 does not explode. Moreover, the arc-snuffing structure 1188 also acts as a fuse that works with the disconnect 1130 after the disconnect 337 is released, allowing the disconnect 1130 to be effective even in implementations that do not necessarily include other fuses or fusible elements between the terminal 1150 and the arrester 190.

What is claimed is:

1. A system comprising:
a surge arrester; and
an energy-limiting device configured for electrical connection to the surge arrester, the energy-limiting device comprising:
  a disconnect comprising:
    a disconnection conductor;
    a locking assembly configured to hold the disconnection conductor in a first position; and
    a key attached to a moveable piston, the key configured to cause the locking assembly to release the disconnection conductor from the first position.

2. The system of claim 1, wherein the moveable piston is configured to push the key toward the locking assembly to release the disconnection conductor from the locking assembly.

3. The system of claim 1, wherein the disconnect further comprises a snuffer element that at least partially surrounds the disconnection conductor when the disconnection conductor is in the first position.

4. The system of claim 3, wherein the snuffer element is a tube.

5. The system of claim 3, wherein the snuffer element comprises a fire-suppressing material.

6. The system of claim 1, wherein the disconnect further comprises a retention structure configured to receive a potting material.

7. The system of claim 1, wherein the energy-limiting device further comprises a current interrupter that comprises at least one fusible element in an interior region of the current interrupter; and the at least one fusible element is electrically connected to the disconnect and to the surge arrester.

8. The system of claim 1, wherein an electrical terminal of the disconnect is configured for direct electrical connection to the surge arrester.

9. A system comprising:
a surge arrester; and
an energy-limiting device configured for electrical connection to the surge arrester, the energy-limiting device comprising:
a current interrupter comprising:
  a current interrupting assembly;
  a sidewall that extends from a first end to a second end;
  a first end cap mounted to the first end; and
  a second end cap mounted to the second end, wherein the sidewall, the first end cap, and the second end cap define an interior region; and wherein,
the energy-limiting device further comprises:
  a disconnect in the interior region, the disconnect comprising:
    a disconnection conductor that, when in a first position, is electrically connected to the current interrupting assembly and forms part of a current path through the energy-limiting device;
    a locking assembly configured to hold the disconnection conductor in a first position; and
    a key attached to a moveable piston, the key configured to cause the locking assembly to release the disconnection conductor from the first position.

10. The system of claim 9, wherein the moveable piston is configured to push the key toward the locking assembly to release the disconnection conductor from the locking assembly.

11. A system comprising:
a surge arrester; and
an energy-limiting device configured for electrical connection to the surge arrester, the energy-limiting device comprising:
  a disconnect comprising:
    a disconnection conductor;
    a locking assembly configured to hold the disconnection conductor in a first position; and
    a key attached to a moveable piston, wherein the locking assembly releases the disconnection conductor from the first position in response to an interaction with the key.

12. The system of claim 11, wherein the locking assembly releases the disconnection conductor from the first position in response to the key applying a force on the locking assembly.

13. The system of claim 12, wherein the key comprises a first side and a second side; the first side is attached to the moveable piston; the second side contacts the disconnection conductor when the locking assembly holds the disconnection conductor in the first position; and the second side of the key has a smaller extent than the first side of the key.

14. The system of claim 11, wherein the disconnect further comprises a housing that defines an interior region, and wherein the locking assembly, the key, and the moveable piston are in the interior region.

15. The system of claim 14, wherein the disconnection conductor extends from a first end to a second end, and the locking assembly is configured to hold the disconnection conductor in the first position with the second end of the disconnection conductor extending through an end of the housing.

16. The system of claim 15, wherein the disconnection conductor exits the housing after being released from the locking assembly.

17. The system of claim 1, wherein the disconnection conductor comprises an opening; the locking assembly comprises a moveable release element that extends into the opening to hold the disconnection conductor in the first position; and, to deactivate the locking assembly, the key pushes the moveable release element away from the opening to release the disconnection conductor.

18. The system of claim 1, further comprising an activation assembly configured for activation based on a current that exceeds a threshold flowing in the disconnect conductor.

19. The system of claim 18, wherein the disconnect further comprises:

a resistive ring;

a conductive body that defines a recess and a bore; and an insulator between the moveable piston and the activation assembly.

20. The disconnect of claim 1, wherein the key comprises a first side and a second side; the first side is attached to the moveable piston; the second side contacts the disconnection conductor when the locking assembly holds the disconnection conductor in the first position; and the second side of the key has a smaller extent than the first side of the key.

\*   \*   \*   \*   \*